J. ARKIN.
ARTIFICIAL TOOTH ANCHORAGE.
APPLICATION FILED OCT. 29, 1921.
1,429,552.
Patented Sept. 19, 1922.
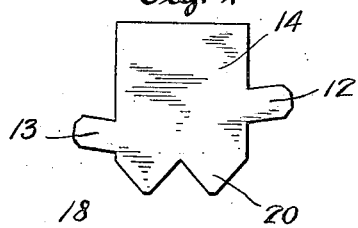
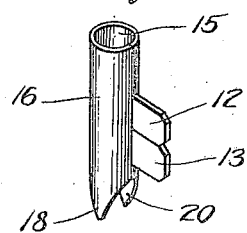
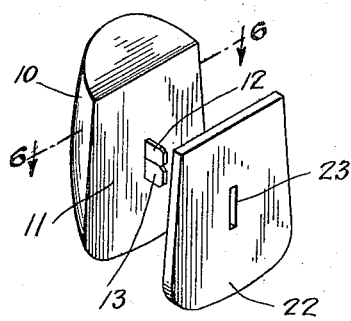
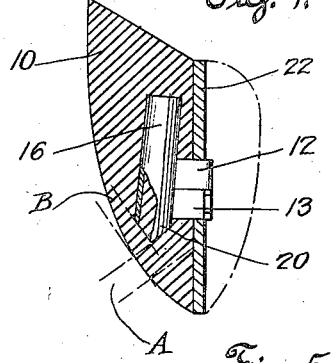
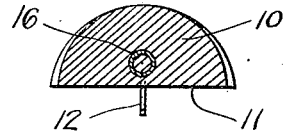
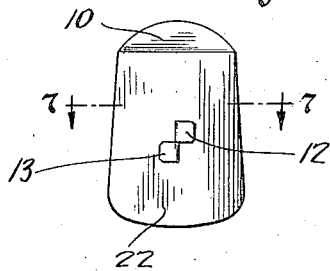
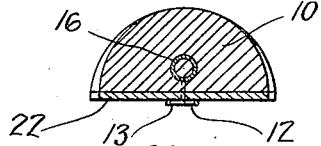
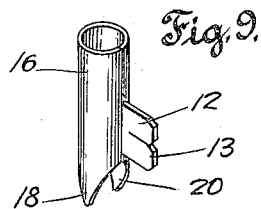
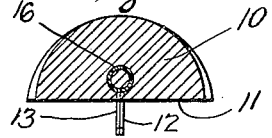
INVENTOR
Jesse Arkin
BY
Percy Freeman
ATTORNEY Patented Sept. 19, 1922.

1,429,552

UNITED STATES PATENT OFFICE.

JESSE ARKIN, OF NEW YORK, N. Y.

ARTIFICIAL-TOOTH ANCHORAGE.

Application filed October 29, 1921. Serial No. 511,293.

*To all whom it may concern:*

Be it known that I, JESSE ARKIN, a citizen of the United States, and resident of 1018 East 163rd Street, in the county of Bronx and State of New York, have invented certain new and useful Improvements in Artificial-Tooth Anchorages, of which the following is a specification.

This invention relates to means by which an artificial tooth facing, fabricated from porcelain or other ceramic material, may be secured to a metallic base plate or backing.

The principal object of this invention is the means by which a tooth form may be positively united to a metallic backing by a metallic coupling element secured within the tooth structure and having projecting wings engaging in a slot formed through the backing plate and folded in clinched relation therewith.

Another object relates to the peculiar conformation of the coupling member, comprising elements new in the art and consisting initially of a thin metallic plate of irregular outline, a hollow cylindrical shank formed centrally and vertically of the plate and a pair of wings extending from the shank, parallel therewith and arranged one above the other.

These and other objects are attained by the novel construction and arrangement of parts hereinafter described and shown by the accompanying drawing forming a material part of this disclosure, and in which:—

Figure 1 is a plan view of a tooth coupling member in the flat blank or first stage of production.

Figure 2 is a perspective view of the tooth coupling coiled and completely formed.

Figure 3 is a perspective view showing a tooth facing with the coupling member embedded therein and a backing plate in position for engagement with the tooth.

Figure 4 is a partial sectional view, showing a tooth engaged with the backing plate, the coupling element partially broken away to show the tooth material within the cylindrical portion of the coupling.

Figure 5 is a rear elevational view of a tooth, a backing plate in place and the coupling wings folded or clinched thereon.

Figure 6 is a sectional view taken on the line 6—6 of Figure 3.

Figure 7 is a similar view taken on the line 7—7 of Figure 5.

Figure 8 is a view similar to Figure 6, but showing a coupling member of modified design.

Figure 9 is a perspective view of a modified form of coupling member.

Referring to the figures in detail, the numeral 10 indicates generally an artificial tooth front or facing having a flat rear surface 11, through which extend a pair of wing elements 12 and 13, these wing elements being integral extensions formed at an angle on the edges of the plate 14 as best shown in Figure 1.

Subsequently the flat plate 14 is coiled into a hollow cylindrical element 15, as in Figure 2, forming with the elements 12 and 13, a unit hereinafter referred to as the coupling member 16.

In view of the well known means employed in the moulding of artificial teeth, no mention is deemed necessary as to their construction except that provision is made in the tooth molds for positively positioning and holding the coupling element during the process of molding the teeth.

That the principle of duplication in tooth formation may be carried out, it is of great importance that the coupling be accurately placed, that embedment shall be central with respect to the mesial and distal surfaces of the tooth facing, and that the distance between the incisal end of the tooth and the lower portion of the coupling be uniformly maintained to effect perfect alinement of the teeth.

By reference to Figure 4, it will be seen that the coupling member is embedded in the tooth at an angle with respect to the flat back of the tooth, this angular embedment providing a gradual increase of tooth material on the front and rear sides of the coupling, the lower end of the coupling being approximately central of the tooth at that point.

It is understood that means for securing tooth facings to various forms of backing plates for rubber work have been devised in the general form of a hollow cylindrical anchorage element having a square lower end, that is to say the end is at a right angle to the axis of the cylinder, a form that has many serious objections and that does not answer the mechanical requirements of the present invention.

To overcome a considerable number of these objections, angular projecting elements 18 and 20 are formed on the lower end portion of the cylindrical coupling element, this formation provides for several very distinct advances in the art. First added strength at the point shown by the construction lines "A". Second the thickening of the tooth wall between the opposite angular projections on the coupling and the labial face of the tooth as shown by the lines "B" of Figure 4.

This thickening of the labial wall absolutely prevents the embedded coupling from showing through the tooth when viewed from the front.

A third advantage is that of more positively securing the coupling within the tooth structure, the projecting elements acting as keys locking and preventing the coupling from any rotary movement.

A backing plate 22, shown in connection with Figure 3, is a backing for a single tooth and is pierced by a slot 23. This slot is approximately the same length as the combined width of the wing elements 12 and 13, the width of the slot being approximately the thickness of the metal from which the coupling is made.

The object of the approximate fit between the slot and the wings being to prevent soldering flux from flowing between the two elements, causing checking of the porcelain and possible discoloration.

In attaching the tooth facing to the backing plate, the wings 12 and 13 are passed through the slot 23, the upper wing 12 being bent to the right and the lower wing 13 bent to the left, as shown in Figure 5, or vice-versa, a short bend draws the plate into close adjacent relation with the flat back of the tooth, and is there held by soldering the bent wings to the backing plate, the solder flowing on the back making a solid mass.

Another feature of importance in connection with this invention is, that while the construction described is essentially of the non-removable type of tooth, it is perfectly adapted to receive a tooth facing known as the "Steele" tooth and in the event of the original facing being broken away from the coupling, the new tooth may be cemented to the old coupling without disturbing the plate or the bridge.

A modification of the coupling is shown, in Figure 8, in which the wing elements are arranged in a horrizontal lateral plane, instead of offset as in Figure 1. A backing plate for this form of coupling requires a slot equal to twice the thickness of the metal from which the coupling is made.

Another modification is shown in Figure 9, in which a single wing element is arranged on one side only of the coupling and the wing being bifurcated, each of the elements so formed is bent in opposite direction and clinched and soldered to the backing plate or bridge.

Although the foregoing is descriptive of the preferred embodiment of the invention, it will be apparent that minor changes may be made in its construction, without the exercise of invention or conflicting with the scope of the claims hereto appended.

Having thus described my invention, what I claim as new and desire to secure by Letters Patent, is:—

1. In an artificial tooth, the combination with a flat backed ceramic tooth facing, of a coupling member embedded therein, said coupling member being initially a thin ductile high fusing metal plate, rectangular in shape and having offset wings projecting at a lateral angle from opposite sides of said rectangle, and a third side having a pair of projections forming spaced angular elements, said metal plate being later formed into a hollow cylindrical shank having a V-shaped lower end and a pair of wings projecting outwardly one above the other in vertical alinement with said shank.

2. In an artificial tooth, the combination with a flat backed ceramic tooth facing, of a coupling member embedded in said tooth facing, said coupling member consisting of a ductile metal formed into a hollow cylindrical shank, a pair of wings projecting outwardly, one above the other, in vertical alinement therewith, and V shaped projections formed on the lower ends of said shank having angular spaces therebetween, the spaces providing a greater distance between the angular edges of said V shaped projections and the labial face of said tooth facing thereby preventing said coupling from showing through the tooth structure.

3. In an artificial tooth, the combination with a flat backed ceramic tooth facing, of a coupling member embedded therein, said coupling member consisting of a high fusing metallic hollow cylindrical shank, a pair of wings projecting outwardly and in vertical alinement therewith and V shaped projections formed on the lower ends of said shank, said projections acting as keys preventing rotary movement of the embedded shank.

4. In an artificial tooth, the combination with a flat backed ceramic tooth facing, of a coupling member consisting of a thin ductile high fusing metal plate formed into a hollow cylindrical shank, a pair of wings arranged one above the other in vertical alinement and integral with said shank, said wings projecting through the flat back of said facing, a backing plate, and means therewith for engaging said wings, and other means for securing said backing plate to said tooth, said means consisting of bending or clinching the projecting wings solidly against said backing plate and soldering thereto.

5. In an artificial tooth, the combination with a plate having an elongated vertical slot, a tooth facing, a hollow tubular coupling embedded therein, alined projections one over the other integral with said coupling, said projections being adapted to extend through the mentioned slot and means for securing said projections when folded oppositely outward over said plate, the axis of said coupling tube being disposed at an angle to flat back of the tooth facing.

6. In an artificial tooth, the combination with a plate having an elongated vertical slot, a tooth facing, a hollow tubular coupling embedded therein at an inclination to the flat back of the tooth body, and projections integral with said tube and extending at an angle to the axis thereof, adapted to pass through the slot and be secured on the outer side of a backing plate.

7. An artificial tooth anchorage blank comprising a thin ductile high fusing metal plate, rectangular in shape and having offset wings projecting at a lateral angle from opposite sides of said rectangle, and a third side having a pair of projections forming spaced angular elements.

8. The method of making an artificial tooth anchorage which comprises forming a thin ductile high fusing metal plate into substantially rectangular shape having offset wings projecting at a lateral angle from opposite sides of said rectangle and a third side having a pair of projections forming spaced angular elements and then forming said metal plate into a hollow cylindrical shank having a V shaped lower end and a pair of wings projecting outwardly in vertical alinement with said shank.

Signed at New York, in the county of New York and State of New York, this 22nd day of October A. D. 1921.

JESSE ARKIN.